United States Patent
Li et al.

(10) Patent No.: US 10,931,586 B2
(45) Date of Patent: Feb. 23, 2021

(54) METHOD AND SYSTEM FOR PREDICTIVE EDGE RESOURCES

(71) Applicant: Verizon Patent and Licensing Inc., Arlington, VA (US)

(72) Inventors: Yuk Lun Li, Morganville, NJ (US); Indraneel Sen, Livingston, NJ (US); Yuexin Dong, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/174,422

(22) Filed: Oct. 30, 2018

(65) Prior Publication Data
US 2020/0136978 A1 Apr. 30, 2020

(51) Int. Cl.
*H04W 72/04* (2009.01)
*H04L 12/851* (2013.01)
*H04W 4/029* (2018.01)
*H04L 29/08* (2006.01)

(52) U.S. Cl.
CPC .......... *H04L 47/24* (2013.01); *H04L 67/141* (2013.01); *H04L 67/148* (2013.01); *H04W 4/029* (2018.02); *H04W 72/04* (2013.01)

(58) Field of Classification Search
CPC ......... H04L 67/14; H04L 65/10; H04L 12/16; H04L 29/06; H04L 45/00; H04W 72/04; H04W 4/00; H04W 8/02; H04W 36/0083; H04W 36/0055; H04W 60/00; H04W 68/00; H04W 92/02; H04W 92/18; H04W 24/02; H04W 80/00; H04W 76/00; H04W 28/00; H04W 40/00
See application file for complete search history.

(56) References Cited

U.S. PATENT DOCUMENTS

| | | | | |
|---|---|---|---|---|
| 10,110,495 | B1* | 10/2018 | Sabella | H04L 12/1407 |
| 10,440,096 | B2* | 10/2019 | Sabella | H04L 67/10 |
| 2014/0185581 | A1* | 7/2014 | Senarath | H04W 36/0072 370/331 |
| 2017/0086049 | A1* | 3/2017 | Vrzic | H04W 12/001 |
| 2018/0263039 | A1* | 9/2018 | Fang | H04L 41/083 |
| 2019/0075497 | A1* | 3/2019 | Zhu | H04W 36/0066 |
| 2019/0141610 | A1* | 5/2019 | Sabella | H04L 41/5019 |
| 2019/0158300 | A1* | 5/2019 | Sabella | H04M 15/84 |
| 2019/0245806 | A1* | 8/2019 | Hanes | H04L 47/808 |
| 2019/0261199 | A1* | 8/2019 | Salkintzis | H04W 24/02 |

* cited by examiner

*Primary Examiner* — Nishant Divecha

(57) ABSTRACT

Systems and methods described herein provide a multi-access edge computing (MEC) prediction service. A network device in a MEC network receives a predicted MEC route for an end device executing an application instance. The predicted MEC route identifies a projected time when the end device will connect to the network device for services and a service requirement for the application instance. The network device reserves resources to service the application instance at the projected time, based on the predicted MEC route. The network device provides a computing service for the application instance using the reserved resources when the end device initiates a data session with the network device.

20 Claims, 9 Drawing Sheets

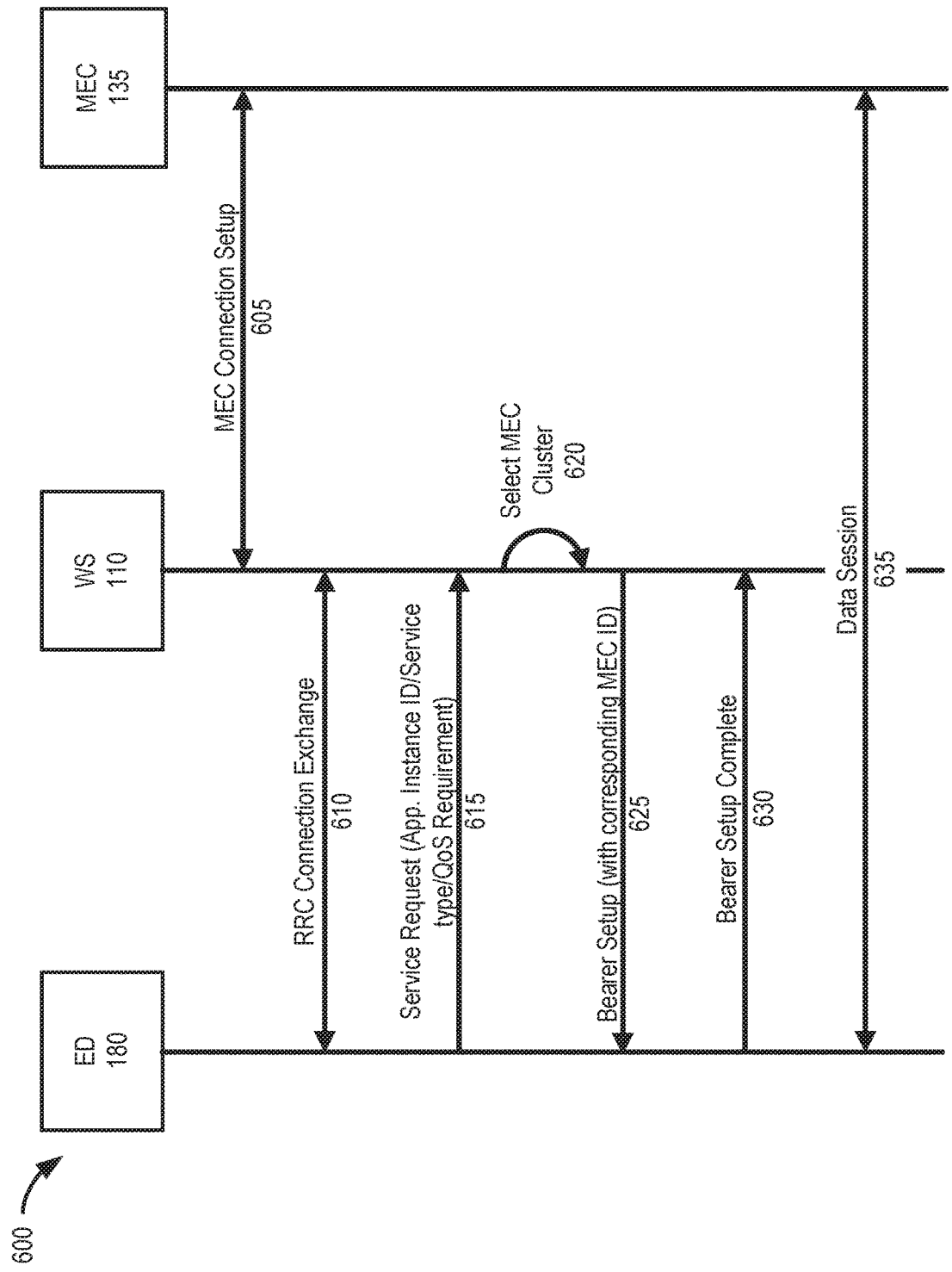

METHOD AND SYSTEM FOR PREDICTIVE EDGE RESOURCES

BACKGROUND

Development and design of radio access networks (RANs) present certain challenges from a network-side perspective and an end device perspective. In order to enhance performance, Multi-access Edge Computing (MEC) (also known as mobile edge computing) is being explored in which core network capabilities (e.g., computational, storage, etc.) are situated at the network edge to improve latency and reduce traffic being sent to the core network.

BRIEF DESCRIPTION OF THE DRAWINGS

FIG. 6 is a signal flow diagram illustrating exemplary communications among devices in a portion of the network environment of FIG. 1.

DETAILED DESCRIPTION OF THE PREFERRED EMBODIMENTS

Figure 1:
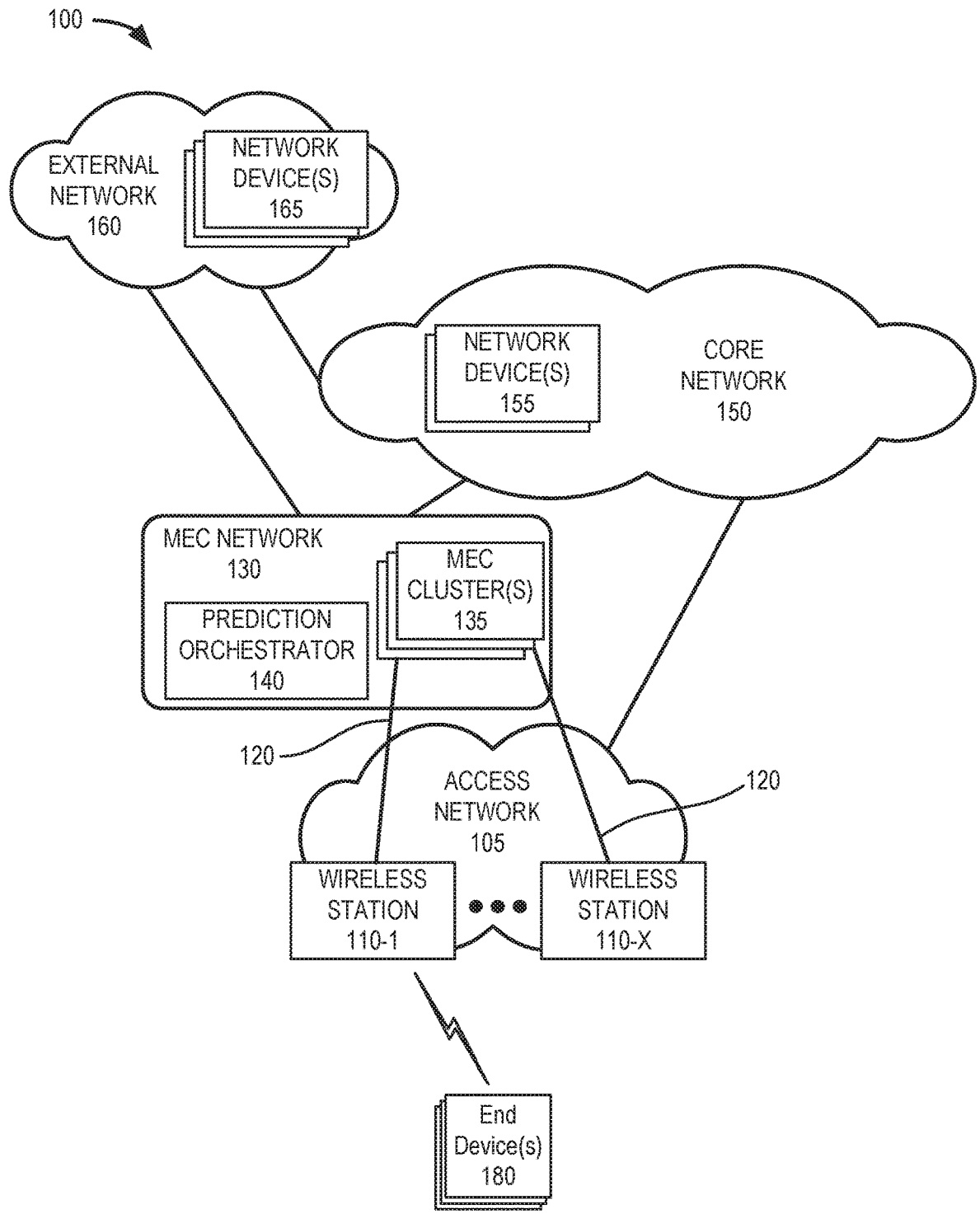
FIG. 1 is a diagram illustrating an exemplary environment in which an exemplary embodiment of a MEC prediction service may be implemented.

The following detailed description refers to the accompanying drawings. The same reference numbers in different drawings may identify the same or similar elements. Also, the following detailed description does not limit the invention.

New broadband cellular networks offer new features and benefits, such as high bandwidth, low latency, and support for massive Internet of Things (IoT) data transfers. One enhancement made possible through these new networks is the use of Multi-access Edge Computing (MEC) servers. These edge servers allow high network computing loads to be transferred onto the edge servers. Depending on the location of the edge servers relative to the point of attachment (e.g., a wireless station for an end device), MEC servers may provide various services and applications to end devices with minimal latency. Generally, lower latencies are achieved when MEC servers are positioned with shorter distances to a network edge. However, since maintenance/management demands increase with more MEC servers, there is a need to optimize use of a limited number of MEC clusters.

For mobility usage, end devices (also referred to as user equipment) can roam between MEC clusters. This roaming requires special consideration from the network in order to maintain low latency interactions. For end devices moving within small cells associated with a single MEC cluster, such change of association between small cells does not impact the context of an application running specific to the end device. For end devices moving between small cells to different MEC clusters, the context of application per end device needs to be transferred from a source MEC cluster to a destination MEC cluster to continue maintaining the low latency communication between the end device and an MEC instance servicing the application.

If end device density increases for an MEC cluster and exceeds a configured threshold for the total resource capacity of the MEC cluster servicing the end devices, then end devices with lower priority (e.g., from an application latency aspect) should be offloaded to a neighboring MEC cluster. Example of such resources may be a central processing unit (CPU), graphics processing unit (GPU), memory, bandwidth, etc. If there is no target MEC where such end device offloading can occur, the resource utilization of such workloads can be gradually diminished till the MEC capacity improves.

In current cellular networks, such as Long-Term Evolution (LTE) networks, the intelligence and control is in the core network. Depending on the needs of the application, such as extremely low latency requirements, this centralized model may not work. When multiple MEC clusters are toward the edge, frequent switching may cause jitter when the MEC is switched. Conversely, when the MEC cluster is moved back toward the core to minimize switching, the resulting latency may not meet the application latency requirements.

According to systems and methods described herein, an MEC prediction service is provided. An end device may synchronize with an MEC network so the MEC network knows the intent (or intended path) of the end device, and the MEC network can predict and prepare the appropriate MEC resources. The end device can signal its intent to the MEC network, and the MEC network can predict when and where the end device will roam in relation to the edge resources.

FIG. 1 is a diagram illustrating an exemplary environment 100 in which an embodiment of the MEC prediction service may be implemented. As illustrated, environment 100 includes an access network 105, a MEC network 130, a core network 150, and an external network 160. Access network 105 may include wireless stations 110-1 through 110-X (referred to collectively as wireless stations 110 and individually (or generally) as wireless station 110). MEC network 130 may include MEC clusters 135 and prediction orchestrator 140; core network 150 may include network devices 155; and external network 160 may include network devices 165. Environment 100 further includes one or more end devices 180.

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a Fifth Generation (5G) RAN, and/or another type of RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), a Bluetooth network, a personal area network (PAN), or another type of network.

According to various exemplary embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

Depending on the implementation, access network 105 may include one or multiple types of wireless stations 110. For example, wireless station 110 may be implemented as a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service. Wireless stations 110 may connect to MEC network 130 via backhaul links 120.

MEC network 130 includes a platform that provides applications and services at the edge of a network, such as access network 105. MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). For purposes of illustration and description, MEC clusters 135 include the various types of network devices that may be resident in MEC network 130, as described herein. According to some exemplary embodiments, MEC clusters 135 may be co-located with network devices 155 of core network 150.

Prediction orchestrator 140 may include logic that provides the MEC prediction service. Prediction orchestrator 140 may receive an intended route of an end device 180 and map the intended route to cells (e.g., coverage areas of wireless stations) that will be along the route. As described further herein, prediction orchestrator 140 may share route predictions among MEC clusters 135 to allocate resource in advance of arrival of the moving end device 180. According to an exemplary embodiment, prediction orchestrator 140 may be included as logic within one or more of MEC clusters 135. According to another implementation, prediction orchestrator 140 may a centralized global orchestration system.

Core network 150 may include one or multiple networks of one or multiple network types and technologies to support access network 105. For example, core network 150 may be implemented to include an Evolved Packet Core (EPC) of an LTE, an LTE-A network, an LTE-A Pro network, a next generation core (NGC) network, and/or a legacy core network. Depending on the implementation, core network 150 may include various network devices, such as for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., $50/100$ Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices (illustrated as network devices 165) that provide various applications, services, or other type of end device assets, such as servers (e.g., web, application, cloud, etc.), mass storage devices, data center devices, and/or other types of network devices pertaining to various network-related functions. According to an exemplary embodiment, one or multiple network devices 165 may be included within MEC clusters 135 to support the MEC prediction service, as described herein.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a wearable device, a vehicle support system, a game system, a drone, or some other type of wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, dual-connectivity, and so forth. Additionally, end device 180 may include one or multiple communication interfaces that provide one or multiple (e.g., simultaneous or non-simultaneous) connections via the same or different RATs, frequency bands, etc. According to an implementation, end device 180 may be configured to support communications for the MEC prediction service. For example, end device 180 may be configured to request the MEC prediction service upon establishing an initial connection with MEC network 130 and provide projected travel plan information, corresponding to the request, to an MEC cluster 135.

Figure 2:
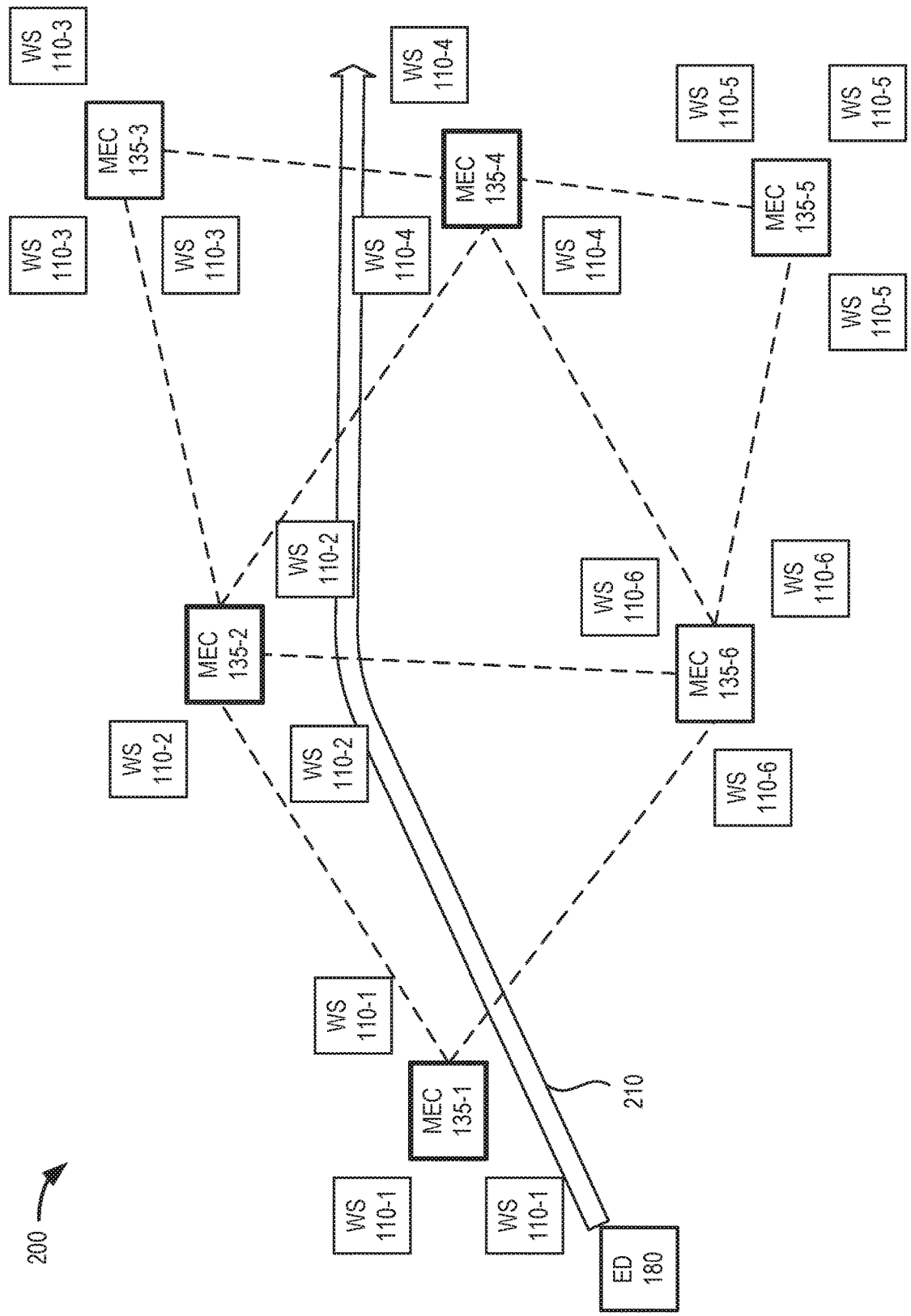
FIG. 2 is a diagram of a network environment illustrating exemplary components of the environment of FIG. 1.

FIG. 2 is a diagram illustrating a network environment 200 that includes exemplary components of environment 100 according to an implementation described herein. As shown in FIG. 2, network environment 200 may include groups of wireless stations (e.g., wireless stations (WS) 110-1, 110-2, 110-3, etc.) each associated with an MEC cluster (e.g., MEC cluster (MEC) 135-1, 135-2, 135-3, etc.). An end device (ED) 180 may roam within network environment 200, connecting to different wireless stations 110.

Generally, each MEC cluster 135 is geographically local to a corresponding group of wireless stations 110. For example, in environment 200, MEC 135-1 may be located in geographic proximity to wireless stations 110-1, while MEC 135-2 may be located in geographic proximity to wireless stations 110-2. The MEC clusters 135 may be connected to each other in a mesh network. Each MEC cluster 135 (e.g., MEC 135-2) will have knowledge of its nearest neighboring MEC clusters (e.g., MEC 135-1, MEC 135-3, MEC 135-4, and MEC 135-6).

When an end device (e.g., end device 180) requests the MEC prediction service for an application, the end device will also provide, to the local (or default) MEC cluster (e.g., MEC cluster 135-1), projected travel path information. The projected travel path information may correspond to, for example, driving directions, a flight plan, a train schedule, a stored commuting pattern, etc. The travel path may be static or may be dynamically updated as travel progresses. For example, in an embodiment, the MEC prediction service may determine that an end device is traveling on a specific road or highway. The MEC prediction service may then determine that there is no deviating from the road or highway for a given distance, thereby being able to predict the future path of the end device without specific directions. Similarly, the MEC prediction service, through machine learning or artificial intelligence techniques, may determine an end device user's habits and identify a familiar or often traveled route at a particular time of day or day of the week. In these ways, the MEC prediction service may predict the end device's future route of travel without prior route information. A unique identifier may be assigned (e.g., by prediction orchestrator 140 of the MEC prediction service) to the instance of the application. The projected travel path information may be correlated to cells/wireless stations 110 that will be in the route. For example, as shown in FIG. 2, a route 210 may be projected for end device 180 to go through a group of wireless stations 110-1 (associated with MEC 135-1), a group of wireless stations 110-2 (associated with MEC 135-2), and a group of wireless stations 110-4 (associated with MEC 135-4).

Figure 3A:
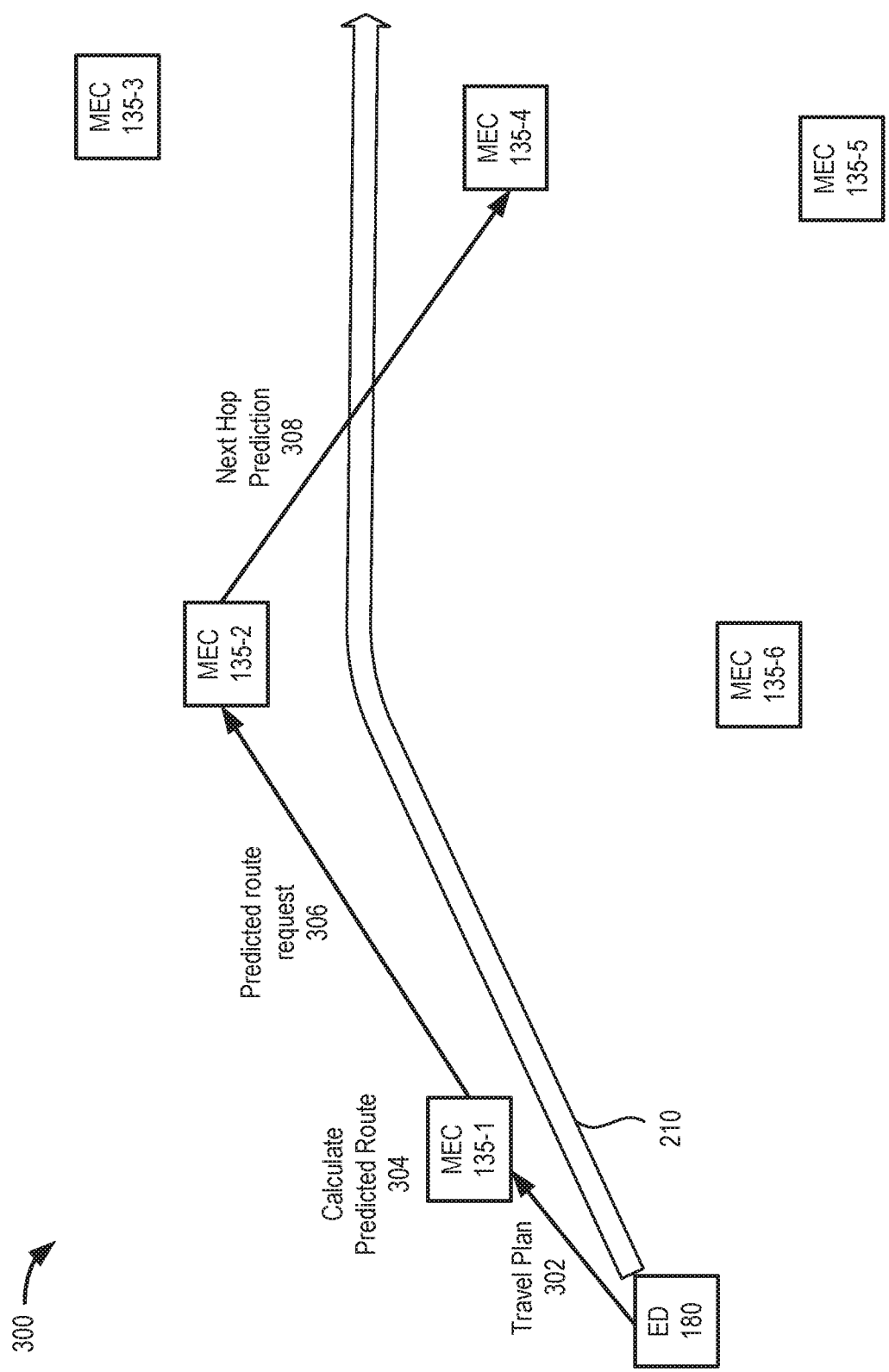
FIGS. 3A-3C are diagrams illustrating an exemplary process of an exemplary embodiment of the MEC prediction service according to an exemplary scenario.
Figure 3B:
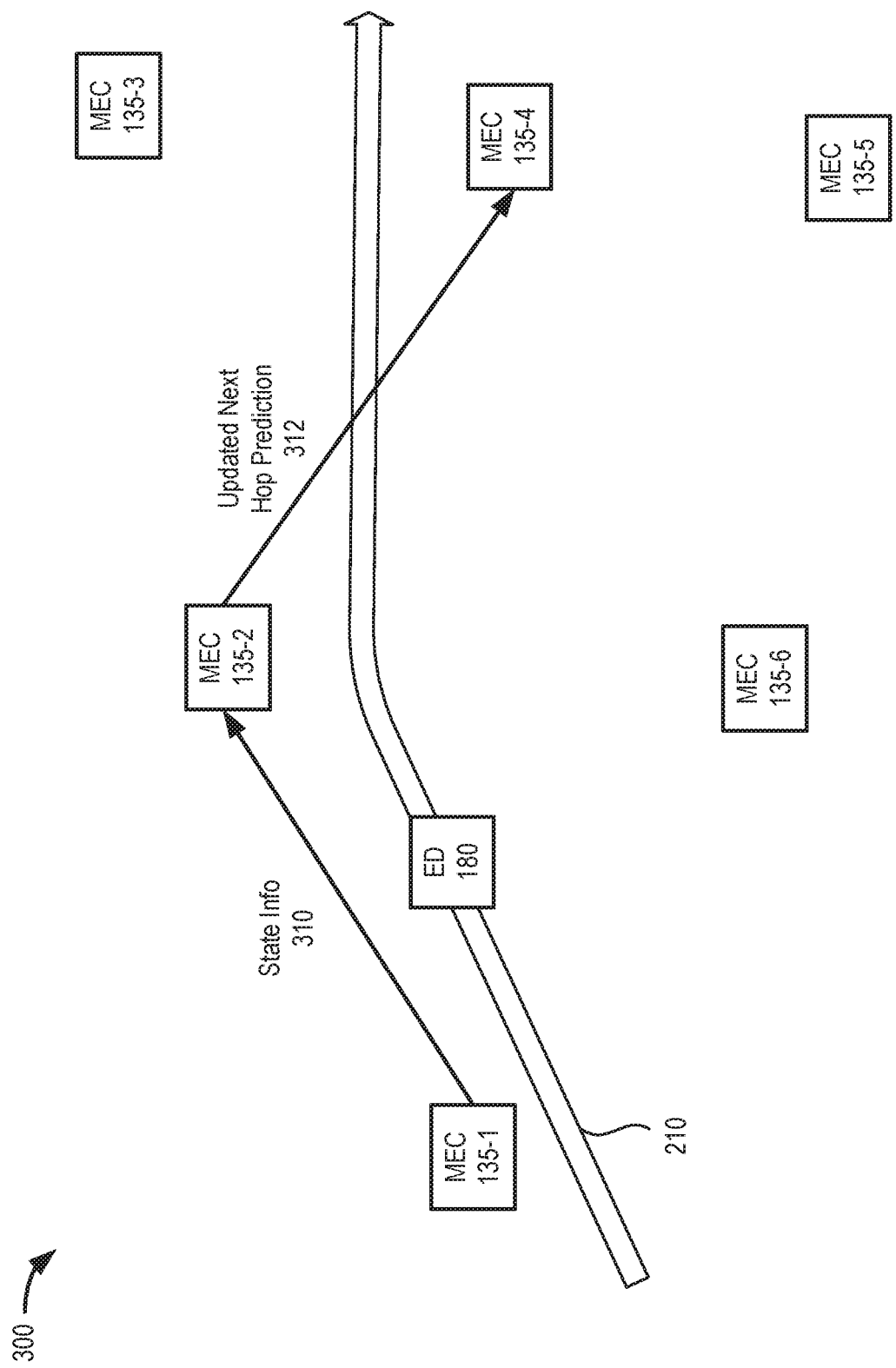
Figure 3C:
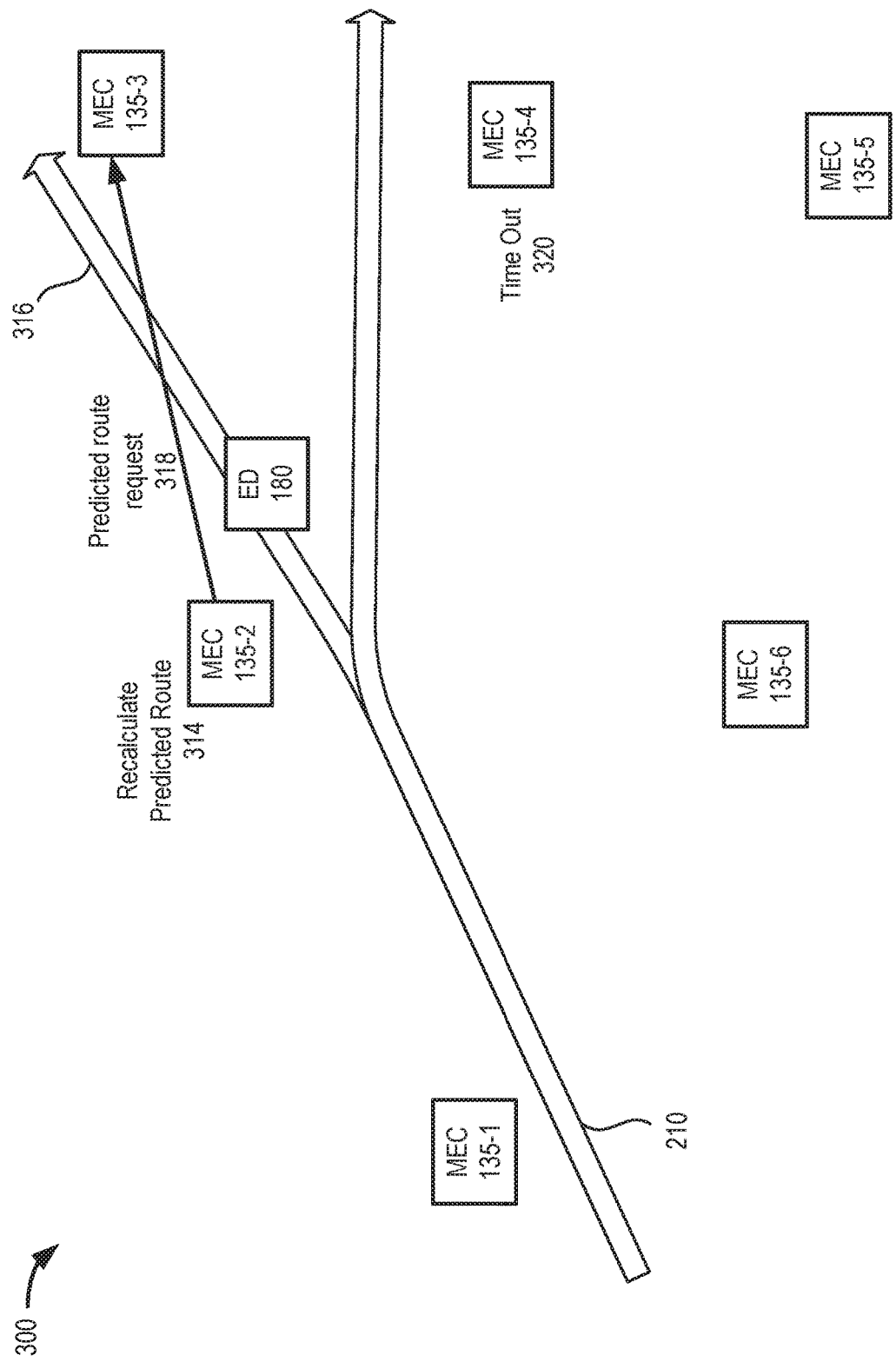

FIGS. 3A-3C are diagrams illustrating an exemplary process of an exemplary embodiment of the MEC prediction service according to an exemplary scenario. FIGS. 3A-3C includes a portion 300 of network environment 200, including MECs 135-1 through 135-6 with corresponding wireless stations 110 (not shown for clarity). Assume, after establishing a connection with a wireless station, that end device 180 connects to a first (e.g., default) MEC cluster 135-1 and requests the MEC prediction service. Referring to FIG. 3A, end device 180 may provide a travel plan 302 to MEC 130-1. Travel plan 302 may include, for example, geographic travel path information for end device 180, such as driving directions, a flight plan, a known commuting pattern, a train schedule to a destination, etc.

Prediction orchestrator 140 executing on MEC cluster 135-1 may calculate 304 predicted route 210 for end device 180 based on travel plan 302 and the physical location of cells/MECs 135. In one implementation, predicted route 210 may include a full beginning-to-end route. In another implementation predicted route 210 may include a selected number (H) of hops (where H is more than 1), with updates provided as end device 180 travels. Prediction orchestrator 140 may assign a confidence level for each hop, such that the farther away the hop from the starting point of device 180, the lower the confidence level. According to one implementation, an estimated time of arrival (ETA) can also be included with predicted route 210.

MEC cluster 135-1 may send a predicted route request 306 to its neighboring MEC(s) 135 that are in predicted route 210 (e.g., MEC 135-2). Predicted route request 306 may include, for example, a list of the resources (e.g., computing resources, such as CPU, GPU, and memory; bandwidth; etc.) required for the application being executed on end device 180, an indication of whether the application is stateless or stateful, and a priority of the application. The neighboring MEC(s) 135-2 may receive predicted route request 306 and send a next hop prediction 308 to its neighbor(s) (e.g., MEC 135-4) that are along predicted path 210. Next hop prediction 308 may include information similar to predicted route request 306 (e.g., resources, state information, priority) with different confidence levels. In response to predicted route request 306, MEC 135-2 may reserve the predicted amount of resources for the time when end device 180 is predicted to be within a service area for MEC 135-2. Similarly, MEC 135-4 may reserve the predicted amount of resources for the time when end device 180 is predicted to be within a service area for MEC 135-4.

Referring to FIG. 3B, end device 180 may begin travel corresponding to predicted path 210. As end device 180 travels, the actual path plus updates on predicted path 210 will be sent at least H hops in advance. The tracking can be performed via GPS updates on end device 180 positions and/or via wireless stations 110 that end device 180 is connected to. As end device 180 reaches a cell boundary (not shown) between a wireless station 110-1 associated with MEC 135-1 and a wireless station 110-2 associated with MEC 135-2, MEC 135-1 may send state information 310 for the application being executed on end device 180.

MEC 135-2 may receive state information 310 and begin servicing the application for end device 180. MEC 135-2 may also provide an updated next hop prediction 312 to MEC 135-4. Updated next hop prediction 312 may include, for example, information similar to next hop prediction 308, but with a higher confidence level.

Referring to FIG. 3C, end device 180 may continue traveling and deviate from predicted path 210. Prediction orchestrator 140 being executed, for example, on MEC 135-2 may detect the deviation and may recalculate 314 a predicted route 316. MEC cluster 135-2 may send a predicted route request 318 to its neighboring MEC(s) 135 that are in recalculated predicted route 316 (e.g., MEC 135-3). Predicted route request 318 may include information similar to predicted route request 306 (e.g., resources, state information, priority) with different confidence levels.

Assuming end device 180 remains on predicted path 316, resources from MEC 135-4 will not be needed. According to one implementation, updated next hop prediction 312 may time out at MEC 135-4, allowing MEC 135-4 to reassign resources that would otherwise be allocated for end device 180.

Although FIGS. 3A-3C illustrate an exemplary process of the MEC prediction service, according to other exemplary embodiments, the process may include additional, different, and/or fewer steps. For example, exchange of state information may not be required in some instances. Additionally, or alternatively, additional communications between MEC clusters 135 may be exchanged to update predictions and/or release unneeded resources.

Figure 4:
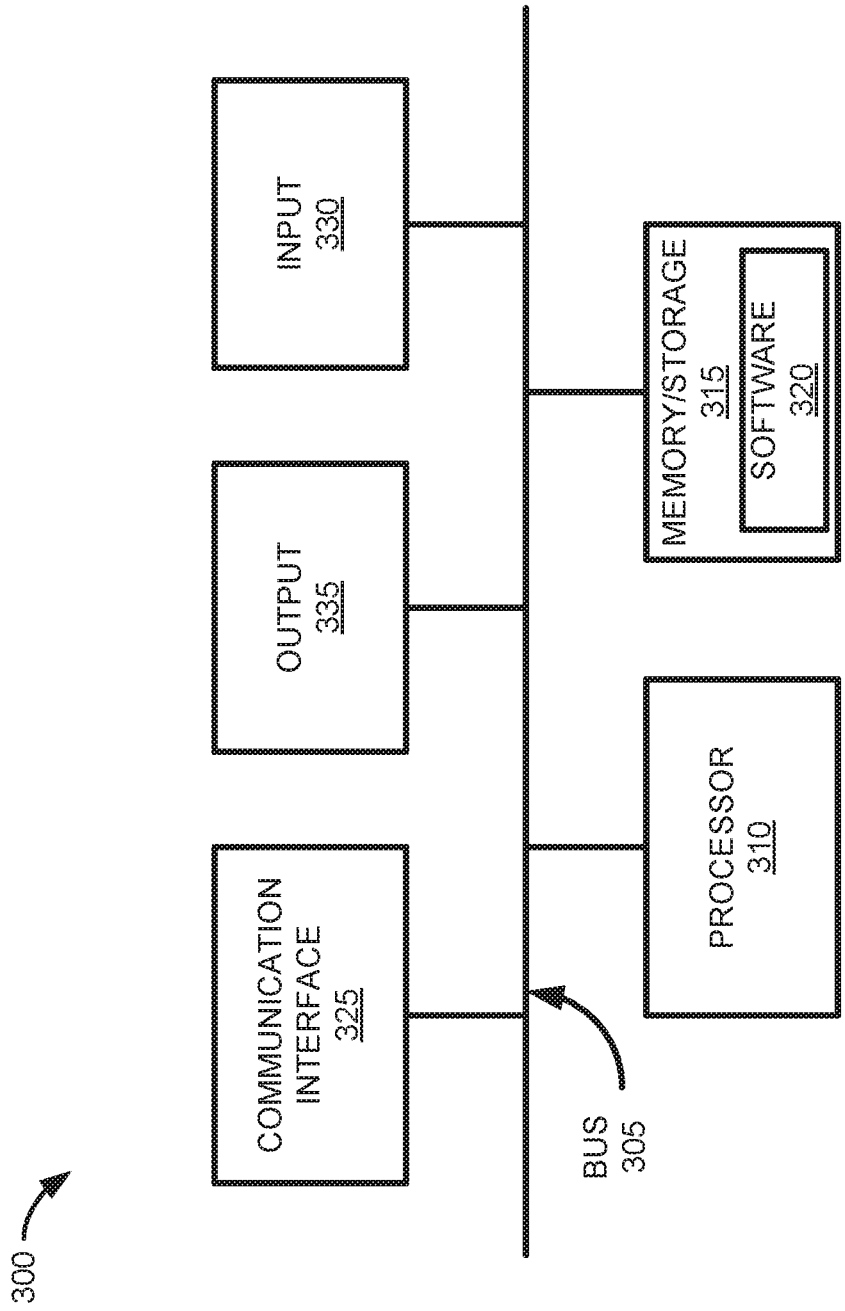
FIG. 4 is a diagram illustrating exemplary components of a device that may correspond to one or more of the devices illustrated and described herein.

FIG. 4 is a diagram illustrating example components of a device 400 according to an implementation described herein. Wireless station 110, MEC cluster 135, prediction orchestrator 140, network device 155, network device 165, and/or end device 180 may each include one or more devices 400. In another implementation, a device 400 may include multiple network functions. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Additionally, for example, MEC cluster 135 and/or prediction orchestrator 140 may include logic to perform tasks, as described herein, based on software 420. Furthermore, end devices 110 may store applications that require services/resources from MEC clusters 135.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include one or more antennas. For example, communication interface 425 may include an array of antennas. Communication interface 425 may operate according to a communication standard and/or protocols. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5C:
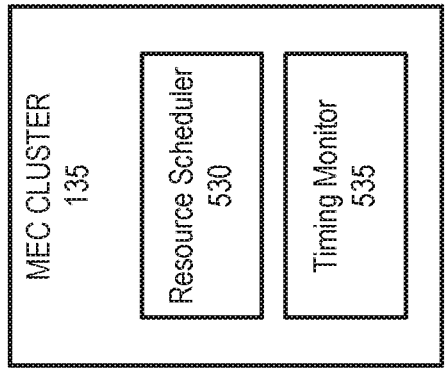
FIG. 5C is a functional block diagram of components implemented in the MEC cluster of FIG. 1.
Figure 5B:
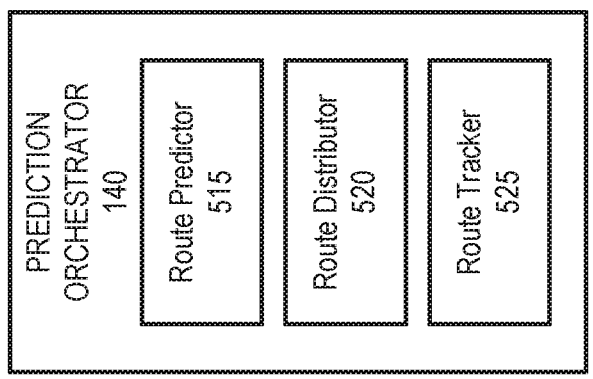
FIG. 5B is a functional block diagram of components implemented in the prediction orchestrator of FIG. 1.
Figure 5A:
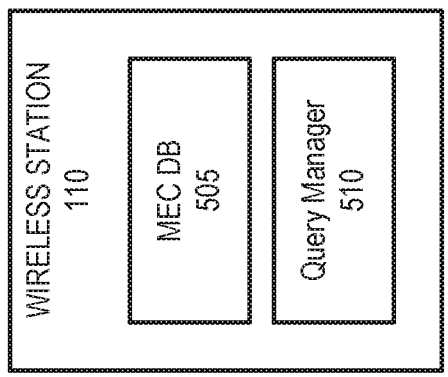
FIG. 5A is a functional block diagram of components implemented in a wireless station of FIG. 1.

FIG. 5A is an exemplary functional block diagram of components implemented in wireless station 110. In one implementation, all or some of the components illustrated in FIG. 5A may be implemented by a processor 410 executing software instructions 420 stored in memory/storage 415. As shown in FIG. 5A, wireless station 110 may include a MEC database (DB) 505 and a query manager 510.

In one implementation, MEC database 505 may store an application instance identifier associated with a corresponding MEC cluster. For example, wireless station 110 may receive and store an application instance identifier and an MEC cluster identifier (e.g., an IP address) from prediction orchestrator 140. When there is a handover of end device 180 to wireless station 110, wireless station 110 may use MEC database 505 to direct end device 180 to the designated MEC cluster 135.

In another implementation, MEC database 505 may store characteristics of MEC clusters 135 in MEC network 130. For example, MEC database 505 may store static latency values between a wireless station 110 and each MEC 135. Static latency values may reflect, for example, a projected and/or measured latency period between a specific wireless station 110 and a specific MEC cluster 135 (e.g., via a backhaul link 120). MEC database 505 may also collect and store variable latency values between end devices 180 and wireless stations 110. The variable latency values and the static latency values may be used to project a total application latency for an end device 180 to an MEC cluster 135. MEC database 505 may further store computer resources (e.g., CPU/GPU), available memory, and available bandwidth associated with an MEC cluster 135. In one implementation, MEC database 505 may store data for all MEC clusters 135 in MEC network 130. In another implementation, MEC database 505 may store data for MEC clusters within a certain geographic region or range of wireless station 110.

Query manager 510 may receive a service request from end device 180 (e.g., for a specific application). In one implementation, query manager 510 may use MEC database to match an application instance identifier with a designated MEC cluster 135. In another implementation, query manager 510 may identify, among other information, a service type and quality of service (QoS) requirements for the service request and identify an MEC cluster 135 that is capable of meeting the service type and QoS requirements. In one implementation, query manager 510 may use MEC database 505 to perform a lookup of available MECs 135 that meet requirements of the service request from end device 180.

FIG. 5B is an exemplary functional block diagram of components implemented in prediction orchestrator 140. In one implementation, all or some of the components illustrated in FIG. 5B may be implemented in a distributed network of MEC clusters 135, each with a processor 410 executing software instructions 420 stored in memory/storage 415. In another implementation, prediction orchestrator 140 may include a centralized component executing software instructions 420 stored in memory/storage 415. As shown in FIG. 5B, prediction orchestrator 140 may include a route predictor 515, a route distributor 520, and a route tracker 525.

Route predictor 515 may receive an intended route of travel from end device 180 as part of an initial request for service. In one implementation, route predictor 515 may assign, for tracking purposes, a unique identifier to the instance of the application being serviced. Route predictor 515 may map or translate the intended route into cells (e.g., RAN coverage areas associated with wireless stations 110) that will provide service over the intended route. Route predictor 515 may correlate the sequence of wireless stations 110 into a corresponding sequence of MEC clusters 135 (referred to herein as a predicted MEC route) to service end device 180 while on the intended route. In one implementation, the sequence of MEC clusters 135 may be a full beginning to end sequence needed along the intended route of end device 180. In another implementation, the sequence of MEC clusters 135 may include an initial number (H) of hops, with updates as end device 180 travels. A hop may indicate an MEC cluster 135 supporting one or more wireless stations 110 on the intended route. Route predictor 515 may assigned a confidence level for each hop, such that the farther away a hop, the lower the confidence level. Route predictor 515 may also assign an estimated time of arrival for hops along the predicted route.

Route distributor 520 may provide the predicted MEC route to hops (e.g., MEC clusters 135) in the predicted MEC route. When prediction orchestrator 140 is a distributed system, route distributor 520 may send the predicted route request to neighboring hops that are in the predicted MEC route, and the neighboring hops will also send the predicted MEC route to subsequent neighboring hops. Route distributor 520 may include with the predicted MEC route, information indicating the resources required for the end device 180, if the corresponding application is stateless or stateful, and a priority of the application.

Route tracker 525 may receive feedback to track end device 180 while on the intended route. In one implementation, route tracker 525 may receive position feedback for end device 180 based on wireless station 110 connectivity. In another implementation, route tracker 525 may receive feedback from end device 180 based on GPS data or another location determining system. As end device 110 travels, route tracker 525 may monitor the actual path and provide confirmation or deviation updates on the intended route to route predictor 515. In one implementation, updates to the predicted MEC route may be sent to MEC clusters 135, at least H hops in advance.

FIG. 5C is an exemplary functional block diagram of components implemented in MEC cluster 135. In one implementation, all or some of the components illustrated in FIG. 5C may be implemented by processor 410 executing software instructions 420 stored in memory/storage 415. As shown in FIG. 5C, MEC cluster 135 may include a resource scheduler 530 and a timing monitor 535.

Resource scheduler 530 may reserve resources for use by end device 180. For example, based on the predicted MEC route, resource scheduler 530 may reserve specific resources (e.g., CPU/GPU, bandwidth, etc.) for a predicted time window. If MEC cluster 135 has sufficient resources at the anticipated time, resource scheduler 530 may prepare for arrival of end device 180. If MEC cluster 135 has a constraint on resources, resource scheduler 530 may evaluate the latency requirements for end device 180 and decide if other nearby MEC clusters 135 can substitute. If a substitute is available, MEC cluster 135 may redirect the session for the application to another MEC cluster 135. If MEC cluster 135 has constrained resources and nearby MEC clusters does not meet the latency needs of end device 180, resource scheduler 530 may use priority to decide whether to assign the application on end device 180 to a different MEC cluster 135 or move a lower priority application (e.g., for a different end device 180) to a different MEC cluster 135.

Timing monitor 535 may monitor prediction lifetimes for MEC cluster 135. For example, a timer in each MEC cluster 135 may be implemented for time outs in case a prediction does not hold, especially for the low confidence level hops. Thus, if an update for a predicted MEC route is not provided to a distant hop within a certain time-out interval, timing monitor 535 may signal resource scheduler 530 to release reserved resources for a particular application/end device 180.

Although FIGS. 5A-5C show exemplary logical components of different devices in network environment 100, in other implementations, these devices may include fewer logical components, different logical components, additional logical components or differently-arranged logical components than depicted in FIGS. 5A-5C. For example, in one implementation, one or more logical components of prediction orchestrator 140 may be performed by MEC clusters 135.

FIG. 6 is a diagram illustrating exemplary communications for an MEC prediction service in a portion 600 of network environment 100. Communications illustrated in FIG. 6 may be repeated at each wireless station handover of end device 180 through an intended route (e.g., route 210). Network portion 600 may include wireless station 110, MEC cluster (MEC) 135, and end device 180. Communications shown in FIG. 6 provide simplified illustrations of communications in network portion 600 and are not intended to reflect every signal or communication exchanged between devices.

As shown in FIG. 6, wireless station 110 may perform an MEC connection setup 605 with MEC cluster 135. For example, based on a predicted MEC route, MEC cluster 135 may associate with specific wireless stations along the identified route. In one implementation of connection setup 605, MEC cluster 135 may detect the unique application instance identifier that should be directed to MEC cluster 135. In another implementation of connection setup 605, MEC cluster 135 may provide (or wireless station 110 may determine) fixed latency values between wireless station 110 and MEC cluster 135. MEC cluster 135 may also indicate an IP address or another identifier for the MEC cluster 135 and resources (e.g., memory, CPU capacity, bandwidth, etc.) available to end devices 180. In one implementation, MEC connection setup 605 may be updated periodically or as changes occur.

Assume, during a handover of end device 180, that end device 180 and wireless station 110 perform a radio resource control (RRC) connection exchange 610. For example, end device 180 may generate an RRC Connection Request message via a control channel and, in response, wireless station 110 may respond with an RRC Connection Setup message. Wireless station 110 may transmit the RRC Connection Setup message to end device 180 via the control channel.

As part of or subsequent to RRC connection exchange 610, end device 180 may generate and transmit a service request message 615. Service request message 615 may include service requirements for an application executed on end device 180. The service requirements may include, for example, the unique application instance identifier, a service type, maximum latency, jitter, state requirements, QoS requirements, etc., for the application.

Wireless station 130 may receive service request message 615 (including the unique application instance identifier and/or application service requirements) from end device 180 and select an MEC cluster 135, as indicated by reference number 620. For example, wireless station 110 may reference MEC database 505 to match the unique application instance identifier to a particular MEC cluster 135. Additionally, or alternatively, wireless station 110 may reference MEC database 505 to identify application service requirements with stored MEC cluster characteristics.

After selecting the MEC cluster 135, wireless station 135 may send to end device 180 a bearer setup message 625 with a corresponding bearer MEC identifier (e.g., an IP address or another unique identifier). End device 180 may receive the bearer setup information and provide a bear setup complete message 630 to wireless station 110 and use the MED identifier to commence a data session 635 with MEC 135. Using data session 135, MEC cluster 135 can provide service to the application on end device 180.

Figure 7:
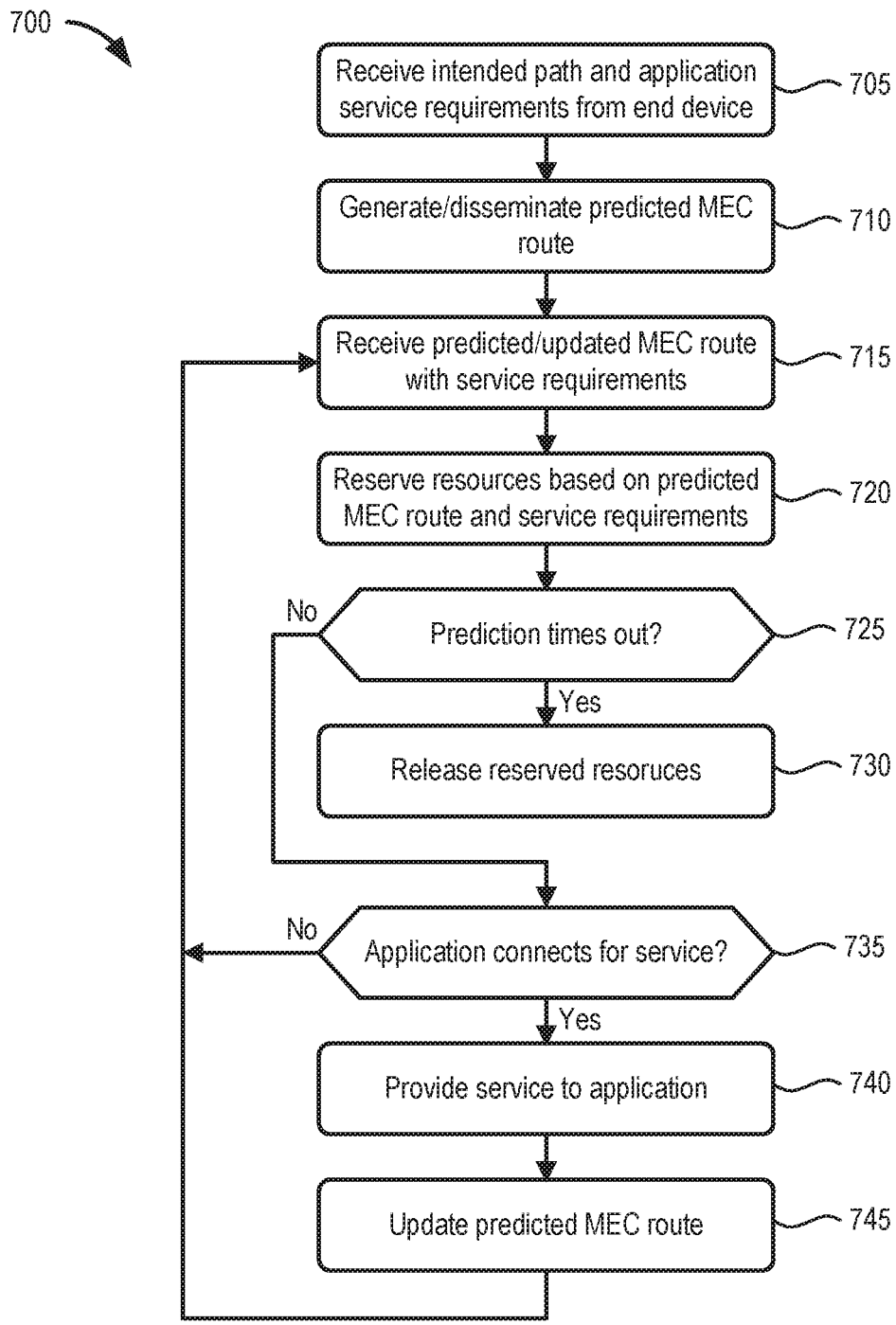
FIG. 7 is a flow diagram illustrating an exemplary process for implementing a MEC prediction service, according to implementations described herein.

FIG. 7 is a flow diagram illustrating an exemplary process 700 for applying an MEC prediction service, according to an implementation described herein. In one implementation, process 700 may be implemented by one or more MEC clusters 135. In another implementation, process 700 may be implemented by more than one MEC clusters 135 in conjunction with one or more other devices in network environment 100.

Referring to FIG. 7, process 700 may include receiving an intended path information and application service requirements from an end device (block 705). For example, upon initial attachment to an MEC cluster (MEC cluster 135-1), end device 180 may provide an intended travel route along with service requirements for an application being executed on end device 180. According to an implementation, the intended route of travel may include, for example, driving directions from another application or synched device (e.g., a map program, GPS application, a vehicle navigation system, etc.), a flight plan, a train schedule, a stored commuting pattern, etc.

Process 700 may also include generating and disseminating a predicted MEC route (block 710). For example, MEC cluster 135-1 (e.g., serving as prediction orchestrator 140/ route predictor 515) may map the intended route to cells that will provide service over the intended route. MEC cluster 135-1 may then correlate a sequence of wireless stations 110 to a predicted MEC route for servicing end device 180 while on the intended route. MEC cluster 135-1 may forward the predicted MEC route information to neighboring MEC clusters (e.g., MEC cluster 135-2).

Process 700 may further include receiving the predicted MEC route information with the service requirements (block 715) and reserving MEC resources (block 720). For example, MEC cluster 135-2 may receive the predicted MEC route information from MEC cluster 135-1. MEC cluster 135-2 may reserve resources for the predicted arrival time of end device 180 to service the application.

Process 700 may further include determining if the prediction from the predicted MEC route times out (block 725). For example, in one implementation predicted MEC route information may indicate a validity window for each hop. In another implementation, each MEC cluster 135 may apply a default timeout window (e.g., a configurable time period beyond a predicted arrival time).

If the prediction from the predicted MEC route times out (block 725—Yes), process 700 may include releasing the reserved resources (block 730). For example, if end device 180 does not connect to MEC 135-2 within a configurable timeout window, MEC 135-2 may release resources that were reserved to service the application instance on end device 180.

If the prediction from the predicted MEC route does not time out (block 725—No), process 700 may include determining if the end device connects for service (block 735). For example, MEC cluster 135-2 may wait for end device 180 to connect during a timeout window.

If the end device does not connect for service (block 735—No), process 700 may return to block 715 to receive an updated predicted MEC route. For example, MEC cluster 135-2 may receive an updated predicted MEC route from MEC cluster 135-1 before a timeout window expires.

If the end device connects for service (block 735—Yes), process 700 may include providing a requested service (block 740) and updating the predicted MEC route (block 745). For example, MEC 135-2 may receive a request for services from the application instance on end device 180. Using the reserved resources, MEC 135-2 may provide services to end device 180. As end device continues to move through cells associated with MEC 135-2, MEC 135-2 may receive updates and/or changes to the intended path of end device 180. MEC 135-2 may update the corresponding predicted MEC route accordingly. For example, MEC cluster 135-2 may update a confidence level for future hops of the predicted MEC route if end device 180 remains on an intended path.

Systems and methods described herein provide a MEC prediction service. A network device in a MEC network receives a predicted MEC route for an end device executing an application instance. The predicted MEC route identifies a projected time when the end device will connect to the network device for services and a service requirement for the application instance. The network device reserves resources to service the application instance at the projected time, based on the predicted MEC route. The network device provides a computing service for the application instance using the reserved resources when the end device initiates a data session with the network device.

The following use cases are illustrative of the MEC prediction service.

High-Definition Map for autonomous vehicles: When a vehicle enters a certain region, such as Manhattan, a map of the area is downloaded to the vehicle from an MEC cluster. The vehicle will use the map to drive autonomously. In certain cases, the system may detect anomalies that do not match the map, e.g., construction changes the lane. The vehicle will upload the changes back to the MEC cluster to be shared with other autonomous vehicles in the area. If the vehicle sends to the network its drive route, or at minimum the intended route for the next few turns, the network (e.g., prediction orchestrator 140) can predict which cell the vehicle will be using and this can be translated to the edge resources the vehicle will be attached to. In addition, if the MEC cluster has access to a real time navigation service, it can also predict the time the vehicle will be in a certain area, thus preparing and allocating edge resources when the resources are expected to be required.

Drone Video: A drone is on a flight path performing a survey. The drone streams video to edge resources (e.g., an MEC cluster) to perform video analytics. The analytics may be stateful. If the MEC network has the flight plan of the drone or the rough direction for the next few turns, the MEC network can anticipate the edge resources to be used. It can also transfer the state from one MEC cluster to another when it anticipates the drone will cross the border into the next cluster.

Infotainment Content Delivery Network (CDN): As a vehicle (e.g., car, train, etc.) moves through a network environment, users consume streaming video contents served by edge CDN servers. Knowing where the vehicle will be traveling will allow the content to be transferred to the local CDN servers (e.g., MEC clusters 135) before it is needed.

Artificial Intelligence (AI) Processing—A vehicle mounted video camera is traveling and is performing AI analytics on the video view. The state is kept on the video device, but the heavy processing is offloaded to the edge computing resources (e.g., MEC clusters 135). In this case, state information transfer may not be necessary. However, anticipating where and when the vehicle will be will allow the MEC network to allocate computing resources and have the application available on the MEC cluster. In some cases, if computing resource demand is high for a particular MEC cluster, the MEC network may try to free up resources. Also, since the vehicle is moving, having information on how long each task takes will allow the MEC network to determine if the computing can be completed before the vehicle crosses the boundary to the next MEC cluster.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A first network device in a multi-access edge computing (MEC) network, comprising:
   a first communications interface for exchanging data with wireless stations of a radio access network (RAN), wherein the first network device is associated with a first group of wireless stations for the RAN;
   a second communications interface for exchanging data with a second network device in the MEC network, wherein the second network device is associated with a second group of wireless stations for the RAN;
   one or more memories to store instructions; and
   one or more processors configured to execute the instructions to:
      receive, from the second network device, a predicted MEC route for an end device executing an application instance, wherein the predicted MEC route is derived from a first intended travel plan provided by the end device, and wherein the predicted MEC route identifies:
         a projected time when the end device will connect to the first network device for services, and
         a service requirement for the application instance,
      reserve, based on the predicted MEC route, computing resources to service the application instance at the projected time,
      provide a computing service for the application instance using the reserved computing resources when the end device initiates a data session with the first network device,
      update, during the providing, the predicted MEC route,
      forward, to a third network device in the MEC network, the updated predicted MEC route that includes a next hop of the updated predicted MEC route, wherein the third network device is associated with a third group of wireless stations for the RAN, and
      send, to the third network device and after forwarding the updated predicted MEC route, updated state information for the application instance when the end device reaches a boundary between a wireless station of the first group of wireless stations and a wireless station of the third group of wireless stations.

2. The first network device of claim 1, wherein the one or more processors are further configured to execute the instructions to:
   receive, from another end device, a second intended travel plan and service requirements for another application instance, and
   generate, based on the second intended travel plan, another predicted MEC route for the other end device.

3. The first network device of claim 2, wherein the service requirements for the other application instance include one or more of a maximum latency, a minimum bandwidth, or a quality-of-service (QoS) requirement for the other application instance.

4. The first network device of claim 2, wherein the another predicted MEC route further comprises time estimates for multiple hops.

5. The first network device of claim 1, wherein, when updating the predicted MEC route, the one or more processors are further configured to execute the instructions to:
   assign a confidence level for each hop of a multiple next hops in the predicted MEC route.

6. The first network device of claim 1, wherein the one or more processors are further configured to execute the instructions to:
   release the reserved computing resources when the end device does not connect to the first network device within a timeout period.

7. The first network device of claim 1, wherein the one or more processors are further configured to execute the instructions to:
receive, from the second network device, state information for the application instance.

8. The first network device of claim 1, wherein, when reserving the resources, the one or more processors are further configured to execute the instructions to:
redirect an existing data session with the first network device to the second network device in the MEC network, or
prepare to redirect a session for the application instance to the second network device.

9. A method, comprising:
receiving, by a first network device in a multi-access edge computing (MEC) network and from a second network device in the MEC network, a predicted MEC route for an end device executing an application instance,
wherein the first network device is associated with a first group of wireless stations for a radio access network (RAN),
wherein the second network device is associated with a second group of wireless stations for the RAN,
wherein the predicted MEC route is derived from a first intended travel plan provided by the end device, and
wherein the predicted MEC route identifies:
a projected time when the end device will connect to the first network device for services, and
a service requirement for the application instance;
reserving, by the first network device and based on the predicted MEC route, computing resources to service the application instance at the projected time;
providing, by the first network device, a computing service for the application instance using the reserved computing resources when the end device initiates a data session with the first network device;
updating, by the first network device and during the providing, the predicted MEC route;
forwarding, by the first network device and to a third network device in the MEC network, the updated predicted MEC route that includes a next hop of the updated predicted MEC route,
wherein the third network device is associated with a third group of wireless stations for the RAN; and
sending to the third network device, by the first network device and after forwarding the updated predicted MEC route, updated state information for the application instance when the end device reaches a boundary between a wireless station of the first group of wireless stations and a wireless station of the third group of wireless stations.

10. The method of claim 9, further comprising:
receiving, by the second network device and from the end device, a second intended travel plan and service requirements for another application instance;
generating, by the second network device and based on the second intended travel plan, the predicted MEC route; and
forwarding, by the second network device and to the first network device, the predicted MEC route.

11. The method of claim 9, wherein the service requirement includes one or more of a maximum latency, a minimum bandwidth, or a quality-of-service (QoS) requirement for the application instance.

12. The method of claim 9, wherein the predicted MEC route comprises time estimates for multiple hops, and wherein the method further comprises:
forwarding, by the first network device and to the third network device in the MEC network, the predicted MEC route with a confidence level for a next hop.

13. The method of claim 12, further comprising:
receiving, by the first network device and from the second network device, state information for the application instance.

14. The method of claim 9, further comprising:
receiving, by the first network device and from the end device, updated geographic travel path information; and
updating, by the first network device, the predicted MEC route based on the updated geographic travel path information.

15. The method of claim 9, further comprising:
releasing, by the first network device, the reserved computing resources when the end device does not connect to the first network device within a timeout period.

16. The method of claim 9, wherein reserving the computing resources further comprises:
redirect an existing data session with the first network device to another network device in the MEC network.

17. The method of claim 9, wherein the first network device and the second network device are part of a mesh network that includes a distributed prediction orchestrator for generating the predicted MEC route.

18. A non-transitory, computer-readable storage media storing instructions executable by one or more processors of a first network device in a multi-access edge computing (MEC) network, which when executed cause the first network device to:
receive, from a second network device in a multi-access edge computing (MEC) network, a predicted MEC route for an end device executing an application instance,
wherein the first network device is associated with a first group of wireless stations for a radio access network (RAN),
wherein the second network device is associated with a second group of wireless stations for a radio access network (RAN),
wherein the predicted MEC route is derived from a first intended travel plan provided by the end device, and
wherein the predicted MEC route identifies:
a projected time when the end device will connect to a second network device, in the MEC network, for services, and
a service requirement for the application instance;
reserve, based on the predicted MEC route, computing resources to service the application instance by the first network device at the projected time;
provide a computing service for the application instance using the reserved computing resources when the end device initiates a data session with the first network device;
update, during the providing, the predicted MEC route;
forward, to a third network device in the MEC network, the updated predicted MEC route that includes a next hop of the updated predicted MEC route,
wherein the third network device is associated with a third group of wireless stations for the RAN; and
send, to the third network device and after forwarding the updated predicted MEC route, updated state information for the application instance when the end device reaches a boundary between a wireless station of the first group of wireless stations and a wireless station of the third group of wireless stations.

19. The non-transitory, computer-readable storage media of claim 18, further comprising instructions to:
- receive a second intended travel plan and service requirements for another application instance, and
- generate, based on the second intended travel plan, another predicted MEC route for the other application instance.

20. The non-transitory, computer-readable storage media of claim 19, further comprising instructions to:
- assign a unique identifier to the application instance; and
- send, to the wireless station of the first group of wireless stations, the unique identifier associated with an identifier for the first network device.

* * * * *